Feb. 7, 1967   E. H. LAND   3,302,541

EXPOSURE CONTROL APPARATUS

Filed April 13, 1964   2 Sheets-Sheet 1

INVENTOR.
Edwin H. Land
BY Brown and Mikulka
and
Donald M. Sadler
ATTORNEYS

Feb. 7, 1967  E. H. LAND  3,302,541
EXPOSURE CONTROL APPARATUS
Filed April 13, 1964  2 Sheets-Sheet 2

INVENTOR.
Edwin H. Land
BY Brown and Mikulka
and
Donald M. Sandler
ATTORNEYS

United States Patent Office 3,302,541
Patented Feb. 7, 1967

3,302,541
EXPOSURE CONTROL APPARATUS
Edwin H. Land, Cambridge, Mass., assignor to Polaroid Corporation, Cambridge, Mass., a corporation of Delaware
Filed Apr. 13, 1964, Ser. No. 359,091
7 Claims. (Cl. 95—10)

This invention relates to cameras having fixed speed shutter mechanisms, and more particularly to cameras of this type into which a comparison photometer is incorporated for the purpose of setting the exposure value of the shutter mechanism.

Conventionally, comparison photometers involve bringing the object to be photographed into a common field of view with a light source of known and controllable brightness such that selective control of the known source permits a photometric balance to be achieved. Usually, the source of known brightness includes a lamp whose brightness can be controlled by varying the resistance in the lamp circuit or by moving a neutral density wedge relative to the lamp. Providing a coupling between the means of the photometer by which the resistance is varied or the wedge moved, and an adjustable diaphragm or the like in a fixed speed shutter mechanism, permits the exposure value of the shutter mechanism to be made functionally dependent on the brightness of the object to be photographed when photometric balance is achieved between the object and the known light source. Having thus used the comparison photometer to set the exposure value of the shutter mechanism, manual actuation of the shutter can then be effected with assurance that the object will be correctly exposed.

The critical factor controlling the ability of a semi-automatic exposure control system of the type described above to achieve proper exposure over a wide range of levels of brightness of the scene to be photographed depends upon the coupling between the photometer and the means by which the exposure value of the shutter mechanism is varied, as well as upon the nature of the last-named means. For example, the brightness of a normally lighted indoor scene may differ by 10 stops or more from the brightness of a normal brightly lit outdoor scene. For 3200 A.S.A. film, a normally lighted indoor scene may require an exposure value of about 10, which can be achieved with a hand-held camera having a fixed speed of about $\frac{1}{60}$ second at about $f$ 4.5. However, a brightly lit outdoor scene may require an exposure value of about 20, which can be achieved with a camera of this type by stopping down the aperture to $f$ 144. Therefore, if a controllable diaphragm were used to establish the exposure value of the shutter mechanism, it would have to be capable of a $2^5$ variation in size, a variation which is quite difficult to achieve as well as to accurately control. The object of the present invention, therefore, is to reduce the complexity in the coupling between the photometric and the means by which the exposure value is varied, as well as to simplify the latter so that proper exposure can be achieved over a wide range of levels of brightness.

Briefly, the invention involves applying light from the object to be photographed to both the comparison photometer and to the exposure aperture of the camera through exposure control apparatus which is operable to simultaneously and to the same degree attenuate the light reaching the photometer and the aperture until the brightness of the object is photometrically balanced with a light source of known and fixed brightness. Thus, the brightness of the light from the object that reaches the exposure aperture will always be the same regardless of the actual brightness of the object, so that correct exposure with a fixed shutter speed is assured. A large range of levels of brightness of objects can be accommodated because the exposure control apparatus includes a pair of plane polarizers mounted in superposed relationship such that both the viewing aperture of the photometer and the exposure aperture are covered, thus assuring that light reaching each aperture will be attenuated simultaneously and to the same degree upon relative rotation of the polarizers between positions of maximum and minimum transmission.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 1:
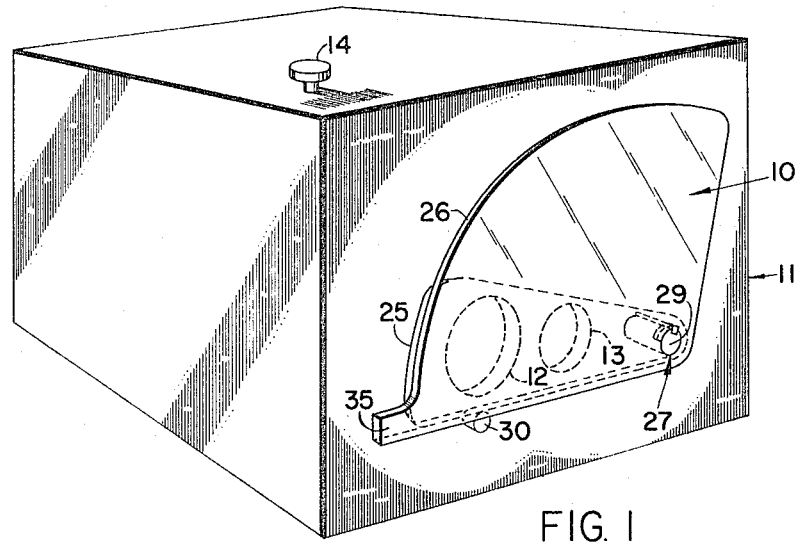
FIGURE 1 is a perspective view of a camera into which the exposure control apparatus of the present invention is incorporated.
Figure 2:
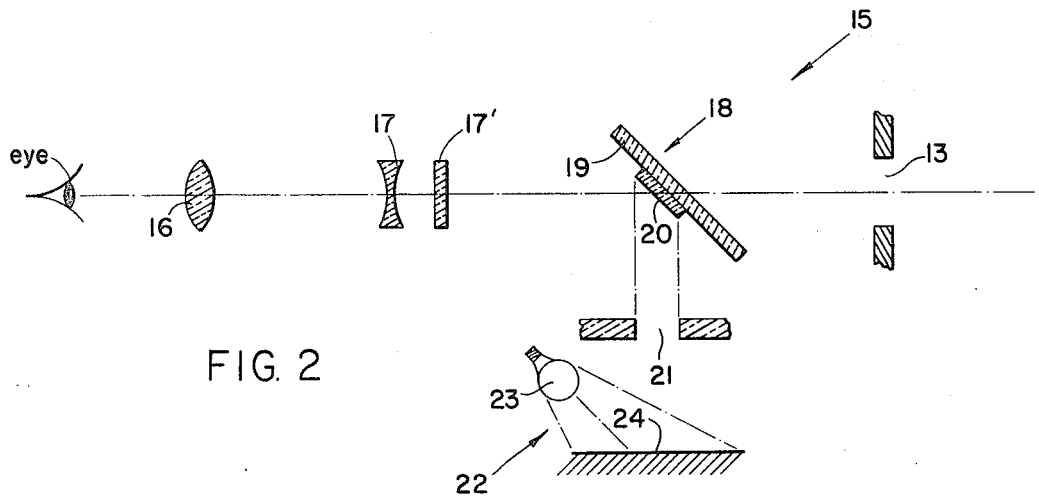
FIG. 2 is a schematic showing of the viewfinder optical system showing the incorporation of a reference light source such that a comparison photometer is defined.

Referring now to FIGURE 1, exposure control apparatus 10 is shown in schematic form attached to camera 11 which includes exposure aperture 12 adjacent to viewing aperture 13. Both apertures face in the direction of the scene being photographed, and light therefrom is adapted to pass through exposure control apparatus 10, and into both apertures. Light passing through the exposure aperture is controlled by shutter means (not shown) which is actuated by release button 14, it being understood that any type of fixed-speed shutter means can be used. Light passing through the viewer aperture passes through viewfinder system 15 shown schematically in FIG. 2.

System 15 includes the usual positive and negative lens 16 and 17 arranged to cause minification of the scene being photographed with the result that an operator whose eye is placed at the positive lens sees substantially the same thing as the objective of the camera. To provide a reference spot of predetermined brightness in the scene as viewed through the viewfinder system, spot generator 18 is used and includes transparent plate 19 inclined at 45° to the optical axis of the viewfinder, reflective spot 20 affixed to the plate, spot aperture 21 in "black box" 22 and lamp 23 of predetermined and constant intensity. With this arrangement, light for lamp 23 is reflected from diffuse surface 24 onto reflective spot 20 and an operator sees a spot of uniform and predetermined intensity superimposed upon the scene as viewed through the viewfinder.

Figure 3:
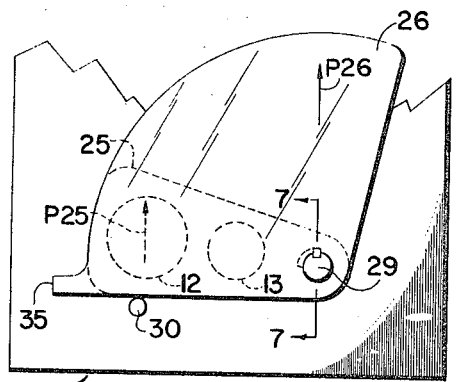
FIG. 3 shows the exposure control apparatus positioned over the exposure and viewing apertures of the camera with a relative position between the polarizers suitable for photographing a scene under relatively low levels of illumination (i.e., indoors)
Figure 5:
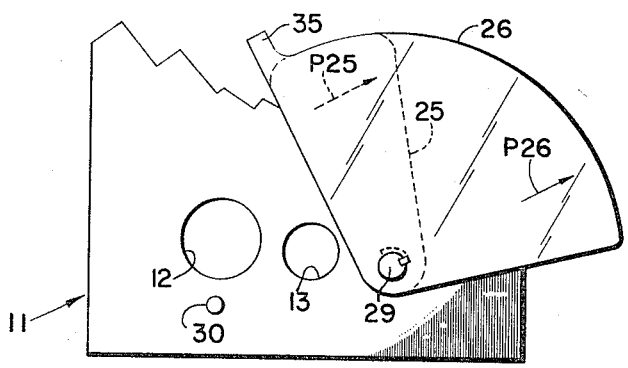
FIG. 5 shows the exposure control apparatus positioned out of overlying position relative to the exposure and viewing apertures.
Figure 6:
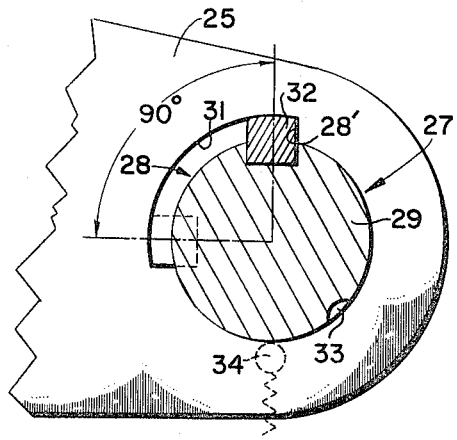
FIG. 6 is a section taken along the line 6—6 of FIG. 7 and is a detail of the lost-motion connection between the two elements of the exposure control apparatus.
Figure 7:
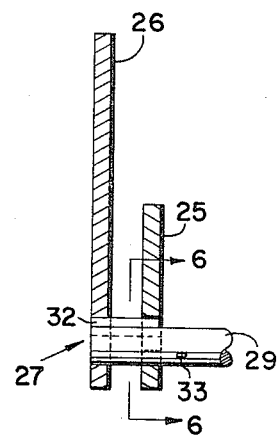
FIG. 7 is a section taken along the line 7—7 of FIG. 3 for further illustrating the lost-motion connection between the elements of the exposure control apparatus.

As previously indicated, the present invention involves the visual matching of the brightness of spot 20 with the brightness of a selected object in the secene to be photographed as seen by an operator looking through positive lens 16. The mechanism by which such matching achieves the correct exposure-value (E.V.) in relation to the selected object in the scene to be photographed includes two plane ploarizers 25 and 26, and the connection 27 therebetween. Polarizer 25 is substantially wedge shaped and is provided at one end with shaped aperture 28 (see FIG. 6) which is engaged around shaft 29 of connection 27 so as to permit rotation of the polarizer from its operative position overlying both apertures 12 and 13 (FIGS. 1 and 3) defined by stop 30 fixed to the front of the camera, to its inoperative position uncovering both apertures (FIG. 5). Polarizer 26 is quadrantly shaped with shaft 29 keyed or otherwise rigidly fixed to polarizer 26 at the apex thereof as shown in FIGS. 3 and 7. Shaft 29 is rotatably mounted on the front of the camera and the bearing in which the shaft is mounted frictionally engages the former so that the angular position of the shaft can be changed easily yet will remain fixed once a particular angular position is selected.

Because of the shape of polarizer 26, the latter will cover both apertures 12 and 13 during about 90° of rotation. The directions of polarizations of the two polarizers are chosen so that the angle between such directions is zero (maximum transmission) when the polarizers have the positions shown in FIG. 3, and 90° when polarizer 26 has been rotated 90° in the counterclockwise direction. The direction of polarization of polarizer 25 is designated $P_{25}$ and the direction of polarization of polarizer 26 is designated $P_{26}$. It is apparent that when polarizer 25 is in its operative position, both shaft 29, and polarizer 26 to which the shaft is rigidly attached, have a certain angular position at which the directions of polarization are normal to each other resulting in minimum transmission of light through both apertures 12 and 13. When shaft 29 is then rotated away from said certain angular position in one direction (clockwise as seen in the drawings), the angle between the directions of polarization decreases until the angle reaches 0° (see FIG. 3). Shaped aperture 28, which includes enlarged portion 31 providing clearance for key 32 fixed to shaft 29 and rigidly attaching the latter to polarizer 26, permits limited rotation of the shaft without imparting any rotation to polarizer 25. Thus, continued rotation of shaft 29 in the clockwise direction as viewed in FIG. 3 causes key 32 to engage edge 28' of aperture 28 in polarizer 25 and effect movement of the latter into inoperative position as shown in FIG. 5. Shaft 29 is provided with detent recess 33 which engages a spring biased ball 34 when polarizer 25 is in its inoperative position and serves to hold both polarizers out of overlying position relative to apertures 12 and 13. Spring means (not shown) may bias polarizer 25 toward its operative position and into engagement with stop 30, and the detent arrangement above described, in such case, would be strong enough to hold against the last-mentioned spring means. However, an operator, by grasping extension 35 on polarizer 26 and imparting rotation to shaft 29 will unseat ball 34 from recess 33, whereupon the spring means will be effective to move polarizer 25 to its operative position.

Having done this, the operator is ready to set the exposure for the camera by looking through lens 16 of the viewfinder system at the scene to be photographed, selecting the object therein for which optimum exposure is desired, and positioning the camera so that the reference spot is adjacent the object. Then extension 35 can be grasped and polarizer 26 rotated relative to polarizer 25 increasing the angle between the planes of polarization of the two polarizers. This has the effect of changing simultaneously, by the same amount, the attenuation of light from the scene reaching the exposure and viewer apertures, and permits a visual match to be achieved between the brightness of the object as seen by the operator looking through lens 16 and the brightness of the spot. A visual match is facilitated by the interposition of red filter 17'. With such match achieved, the operator then frames the scene properly and depresses shutter release 14. With a fixed speed shutter and the brightness of the scene as presented to the exposure aperture adjusted as above described, the object selected by the operator will be properly exposed.

Figure 4:
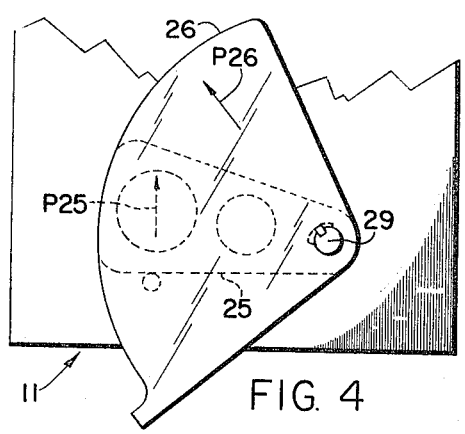
FIG. 4 is similar to FIG. 3 but shows another relative position between the polarizers which would be suitable for photographing a scene whose illumination is somewhat greater than that for which the position shown in FIG. 3 is suitable.

When the actual brightness of the object with which the spot is compared by the operator looking through the viewfinder system is below a predetermined level, it will not be possible to match the brightness of the spot with the brightness of the object even when polarizer 26 is rotated such that its direction of polarization is parallel to the direction of polarization of polarizer 25 (maximum transmission, FIG. 3). In such case, the spot will appear to the operator as being brighter than the object. By providing for the movement of both polarizers out of overlying position relative to apertures 12 and 13 (FIG. 4), the brightness comparison system can be employed to properly expose an object whose brightness is about one stop below the value at which a brightness match can be achieved at maximum transmission. In other words, provision for uncovering both apertures achieves a onestop improvement in the brightness range of the scene over which the brightness matching technique can be employed to achieve correct exposure.

While the embodiment shown in the drawing has the two polarizers mounted to one side of both apertures, it is possible to mount the polarizers between the apertures. In such case, the polarizers could conveniently be circular discs of plane polarized material, with no change in the principle of operation already described. In addition, the polarizers may be located behind the apertures rather than in front. In either situation, the polarizers always intercept light entering the exposure and the viewing aperture. However, it is possible to mount the polarizers within the camera such that they intercept light from the exposure aperture and light from the standard lamp 23, but not light from the viewer aperture. In such case, the brightness of the spot of light would be changed simultaneously and to the same extent that the brightness of light passing the exposure aperture would be changed.

In order to prevent polarized light (such as that due to reflected glare) from the object to be photographed from interfereing with achieving proper exposure of the object, the apparatus shown in the drawing can be modified by providing a quarter-wave plate on the front of polarizer 26.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Exposure control apparatus for a camera having a fixed speed shutter covering an exposure aperture, comprising:
   a comparison photometer having a viewing aperture through which light from an object to be photographed can be brought into a common field with a light source of known brightness; and
   first means for attenuating, simultaneously and to the same degree, light from the scene to be photographed that reaches said viewing aperture and said exposure aperture so that a photometric balance between said object and said light source can be achieved, said first means comprising a pair of superposed plane polarizers covering both said exposure aperture and said viewing aperture;

means mounting said polarizers for relative rotation between angular positions of minimum and maximum transmission; and second means to actuate said shutter to uncover said exposure aperture and effect exposure.

2. Apparatus in accordance with claim 1 wherein said means mounting said polarizers for relative rotation is constructed and arranged so that rotation in a direction increasing transmission beyond the point of maximum transmission moves both of said polarizers to a position uncovering both said exposure aperture and said viewing aperture.

3. Apparatus in accordance with claim 2 wherein means are provided for releasably maintaining both of said polarizers in a position uncovering both said exposure and said viewing aperture.

4. In a camera having an exposure aperture and a viewer aperture through which light from a scene being photographed can pass, exposure control apparatus comprising:

a viewfinder system operably connected to said viewer aperture and through which an operator can see the scene being photographed;

means associated with said viewfinder system for producing a reference spot of light of predetermined brightness within the field of view of said viewfinder system; and means to change simultaneously by the same amount the attenuation of light from said scene reaching said exposure and viewer apertures for effecting a visual match between the brightness of a selected portion of said scene as viewed by an operator through said viewfinder system and the brightness of said spot, said last-named means comprising first plane polarizer means positioned relative to both said exposure and viewer apertures for polarizing the light from said scene passing through said apertures;

second plane polarizer means for simultaneously covering both said exposure and viewer apertures in superposed relation to said first polarizer means and movable relative thereto; and said first and second polarizer means being constructed and arranged so that at each relative position therebetween the angular relationship between the directions of polarization of said first and second polarizer means relative to said exposure aperture is the same as the angular relationship between the directions of polarization of said first and second polarizer means relative to said viewer aperture.

5. In a camera having an exposure aperture and a viewer aperture through which light from a scene being photographed can pass, exposure control apparatus comprising:

a viewfinder system operably connected to said viewer aperture and through which an operator can see the scene being photographed;

means associated with said viewfinder system for producing a reference spot of light of predetermined brightness within the field of view of said viewfinder system; and means to change simultaneously by the same amount the attenuation of light from said scene reaching said exposure and viewer apertures for effecting a visual match between the brightness of a selected portion of said scene as viewed by an operator through said viewfinder system and the brightness of said spot, said last-named means comprising a first plane polarizer in superposed relationship to both said exposure and viewer apertures; and a second plane polarizer covering both of said apertures in superposed relation to said first polarizer and rotatable relative thereto for changing the angular relationship between the directions of polarization of said first and second polarizers.

6. Apparatus in accordance with claim 5 wherein rotation of said second polarizer in one direction causes the angle between the directions of polarization to decrease, and wherein said first and second polarizers are interconnected such that continued rotation of said second polarizer in said one direction after the directions of polarization are parallel moves said first polarizer out of superposed relation to said apertures.

7. In a camera having an exposure aperture and a viewer aperture through which light from a scene being photographed can pass, exposure control apparatus comprising:

a viewfinder system operably connected to said viewer aperture and through which an operator can see the scene being photographed;

means associated with said viewfinder system for producing a reference spot of light of predetermined brightness within the field of view of said viewfinder system; and means to change simultaneously by the same amount the attenuation of light from said scene reaching said exposure and viewer apertures for effecting a visual match between the brightness of a selected portion of said scene as viewed by an operator through said viewfinder system and the brightness of said spot, said last-named means comprising a first plane polarizer rotatably mounted on said camera and having a first position in superposed relationship to said exposure and viewer apertures and a second position out of superposed relationship;

means for releasably retaining said first polarizer in said first position;

a second plane polarizer rotatably mounted on said camera in superposed relationship to said first polarizer, and constructed and arranged so as to cover said apertures during approximately 90° of rotation;

the direction of polarization of said first polarizer when the latter is in said first position being normal to the direction of polarization of said second polarizer when the latter is in a certain angular position; and means interconnecting said first and second polarizers so that rotation of said second polarizer in one direction away from said certain angular position serves to first reduce the angle to zero between the directions of polarization of said first and second polarizers and then to rotate said first polarizer to its second position.

References Cited by the Examiner

UNITED STATES PATENTS

| | | | |
|---|---|---|---|
| 2,112,701 | 3/1938 | Leitz | 95—10 |
| 2,145,914 | 2/1939 | Bartels | 95—64 |
| 2,169,688 | 8/1939 | Frotschner | 95—64 |
| 3,062,087 | 11/1962 | Zandman et al. | 88—65 X |

NORTON ANSHER, *Primary Examiner.*

J. F. PETERS, *Assistant Examiner.*